US012216241B2

(12) United States Patent
Wright

(10) Patent No.: US 12,216,241 B2
(45) Date of Patent: *Feb. 4, 2025

(54) DATA PROCESSING SYSTEM FOR GENERATING WEATHER REPORTS AND RELATED METHODS

(71) Applicant: WEATHER STRIKE, LLC, Houston, TX (US)

(72) Inventor: Robert L. Wright, Houston, TX (US)

(73) Assignee: WEATHER STRIKE, LLC, Houston, TX (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/938,691

(22) Filed: Oct. 7, 2022

(65) Prior Publication Data

US 2023/0034168 A1 Feb. 2, 2023

Related U.S. Application Data

(63) Continuation of application No. 17/550,342, filed on Dec. 14, 2021, now Pat. No. 11,487,048, which is a continuation-in-part of application No. 16/952,200, filed on Nov. 19, 2020, now abandoned.

(60) Provisional application No. 62/937,404, filed on Nov. 19, 2019.

(51) Int. Cl.
*G01W 1/10* (2006.01)
*G01W 1/00* (2006.01)
*G06F 16/29* (2019.01)

(52) U.S. Cl.
CPC ............... *G01W 1/10* (2013.01); *G06F 16/29* (2019.01); *G01W 2001/006* (2013.01)

(58) Field of Classification Search
CPC ............ G01W 1/10; G01W 2001/006; G01W 2203/00; G06F 16/29; Y02A 90/10
See application file for complete search history.

(56) References Cited

U.S. PATENT DOCUMENTS

| | | | |
|---|---|---|---|
| 2004/0183695 A1 | 9/2004 | Ruokangas et al. | |
| 2005/0197775 A1* | 9/2005 | Smith | G08B 21/10 340/995.13 |
| 2007/0214023 A1 | 9/2007 | Mathai et al. | |
| 2010/0179955 A1 | 7/2010 | Wu et al. | |

(Continued)

OTHER PUBLICATIONS

U.S. Environmental Protection Agency Office of Air Quality Planning and Standards "Aerminute User™s Guide" EPA-454/B-15-006; Oct. 2015; pp. 65.

(Continued)

*Primary Examiner* — Yoshihisa Ishizuka
(74) *Attorney, Agent, or Firm* — Allen, Dyer, Doppelt + Gilchrist, PA

(57) ABSTRACT

A data processing system is for producing a weather report. The data processing system may include external weather event databases, each external weather event database having a different weather event data set, and a server in communication with the external weather event databases. The server may be configured to import the different weather event data sets from the external weather event databases, perform a filtering process on the different weather event data sets from the external weather event databases, and generate the weather report based upon the filtered different weather event data sets from the external weather event databases and a geolocation.

20 Claims, 15 Drawing Sheets

(56) References Cited

U.S. PATENT DOCUMENTS

2018/0313975 A1* 11/2018 Chen .................. G01W 1/10
2019/0004210 A1    1/2019 Altschule

OTHER PUBLICATIONS

Watson, Leela "Upgrade Summer Severe Weather Tool", Applied Meteorology Unit Kennedy Space Center, Florida, NASA Contractor Report CR-2011-216299, Apr. 2011.

* cited by examiner

FIG. 3B

Report Parameters

| | |
|---|---|
| Date Range | 5/31/2017 through 5/30/2021 |
| SED - Hail (Ground Truth) | Minimum Size: 0.75" | Maximum Distance: 6 mi |
| SWDI - Hail (Radar) | Minimum Size: 1.5" | Maximum Distance: 6 mi |
| SED - Thunderstorm Wind (Ground Truth) | Minimum Wind Speed: 50 mph | Maximum Distance: 10 mi |
| SED - High Wind (Ground Truth) | Minimum Wind Speed: 70 mph | NWS Zone: Seminole |
| ASOS - Surface Wind (Ground Based Weather Sensors) | Minimum Wind Speed: 50 mph | 1st nearest sensor; +2nd if <50 mi |
| SED - Tornado (Ground Truth) | Maximum Distance: 10 mi | |
| SWDI - Tornadic Events (Radar) | Maximum Distance: 2 mi | |

*FIG. 4B*

SED Information (Observed Events)

SED = Hail Observed Event | Minimum Size: 0.75" | Maximum Distance: 6 mi

| Item # (ID) | Location | Time | Source | Hail Size | Azimuth (Site to Event) | Distance (Lat,Long) |
|---|---|---|---|---|---|---|
| | 9/20/2018 (Hail Event - 1) |||||||
| #1 (7854898) | Jones Lndg, FL (Seminole County) | 14:57 EDT | Trained Spotter | 1.5" | 150° | 5.42 mi. (28.60°, -81.29°) |
| #2 (7928946) | Oviedo, FL (Seminole County) | 14:59 EDT | Social Media | 1.75" | 129° | 4.20 mi. (28.65°, -81.19°) |
| | 4/6/2019 (Hail Event - 2) |||||||
| #1 (8084498) | Winter Spgs, FL (Seminole County) | 20:55 EDT | Trained Spotter | 1" | 286° | 2.93 mi. (28.70°, -81.29°) |
| | 5/21/2020 (Hail Event - 3) |||||||
| #1 (8823988) | Sipes, FL (Seminole County) | 19:30 EDT | Trained Spotter | 1.75" | 332° | 4.80 mi. (28.75°, -81.28°) |
| #2 (8802401) | Sipes, FL (Seminole County) | 19:41 EDT | Trained Spotter | 1.25" | 321° | 5.48 mi. (29.75°, -81.36°) |
| #3 (8823956) | Lake Mary, FL (Seminole County) | 19:42 EDT | Public | 2" | 307° | 5.85 mi. (28.74°, -81.32°) |
| | 4/11/2021 (Hail Event - 4) |||||||
| #1 (9488810) | Golden Rod, FL (Seminole County) | 10:48 EDT | Public | 1.25" | 210° | 5.52 mi. (28.62°, -81.29°) |
| #2 (9488915) | Gabriella, FL (Seminole County) | 10:49 EDT | Emergency Manager | 1.75" | 198° | 5.00 mi. (28.62°, -81.27°) |
| #3 (9488311) | Gabriella, FL (Seminole County) | 10:50 EDT | Trained Spotter | 2" | 186° | 3.38 mi. (28.64°, -81.25°) |
| #4 (9488835) | Fern Park, FL (Seminole County) | 10:50 EDT | Trained Spotter | 1" | 244° | 4.49 mi. (29.66°, -81.31°) |
| #5 (9488594) | Union Park, FL (Orange County) | 10:51 EDT | Public | 1" | 165° | 5.61 mi. (28.61°, -81.22°) |
| #6 (9488836) | Gabriella, FL (Seminole County) | 10:54 EDT | Trained Spotter | 2" | 193° | 4.17 mi. (28.63°, -81.26°) |
| #7 (9488862) | Oviedo, FL (Seminole County) | 10:56 EDT | Trained Spotter | 1" | 135° | 3.75 mi. (28.65°, -81.20°) |
| #8 (9488430) | Fern Park, FL (Seminole County) | 11:00 EDT | Broadcast Media | 1" | 226° | 3.88 mi. (29.65°, -81.29°) |
| #9 (9488941) | Chuluota Sem Rnch Ar, FL (Seminole County) | 11:03 EDT | Public | 1.5" | 129° | 5.18 mi. (28.65°, -81.17°) |

*FIG. 4D*

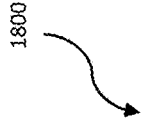

| Item # (ID) | Location | Time | Source | Event | Azimuth (Site to Event) | Distance (Lat,Long) |
|---|---|---|---|---|---|---|
| 7/4/2017 (Thunderstorm Event - 1) |||||||
| #1 (8685582) | Winter Park, FL (Orange County) | 17:05 EDT | Broadcast Media | 60 mph (52 kt.) Type: Estimated Gust WFO: MLB | 223° | 5.47 mi. (28.69°, -81.34°) |
| 8/13/2018 (Thunderstorm Event - 2) |||||||
| #1 (7738675) | Sanford Nas, FL (Seminole County) | 18:19 EDT | Public | 55 mph (48 kt.) Type: Estimated Gust WFO: MLB | 345° | 4.37 mi. (28.75°, -81.26°) |
| 4/8/2019 (Thunderstorm Event - 3) |||||||
| #1 (8513899) | Winter Spgs, FL (Seminole County) | 20:55 EDT | Emergency Manager | 60 mph (52 kt.) Type: Estimated Gust WFO: MLB | 280° | 3.83 mi. (28.70°, -81.21°) |
| 4/9/2019 (Thunderstorm Event - 4) |||||||
| #1 (8568333) | Oviedo, FL (Seminole County) | 15:25 EDT | Broadcast Media | 58 mph (50 kt.) Type: Estimated Gust WFO: MLB | 135° | 2.68 mi. (28.66°, -81.21°) |
| #2 (8658425) | Bridgend, FL (Seminole County) | 15:35 EDT | Broadcast Media | 58 mph (50 kt.) Type: Estimated Gust WFO: MLB | 43° | 9.43 mi. (28.79°, -81.14°) |
| 5/5/2019 (Thunderstorm Event - 5) |||||||
| #1 (8108617) | Maitland, FL (Orange County) | 14:16 EDT | Broadcast Media | 60 mph (52 kt.) Type: Estimated Gust WFO: MLB | 240° | 8.42 mi. (28.85°, -81.96°) |
| #2 (8198619) | Oviedo, FL (Seminole County) | 14:23 EDT | Public | 60 mph (52 kt.) Type: Estimated Gust WFO: MLB | 134° | 2.83 mi. (28.66°, -81.21°) |
| 6/9/2019 (Thunderstorm Event - 6) |||||||
| #1 (8199370) | Forest City, FL (Seminole County) | 14:42 EDT | Law Enforcement | 60 mph (52 kt.) Type: Estimated Gust WFO: MLB | 255° | 9.19 mi. (28.66°, -81.35°) |
| 6/25/2019 (Thunderstorm Event - 7) |||||||
| #1 (9238393) | (SFB) Sanford Apt, FL (Seminole County) | 18:31 EDT | ASOS | 59 mph (51 kt.) Type: Measured Gust WFO: MLB | 1° | 6.33 mi. (28.76°, -81.24°) |
| 4/20/2020 (Thunderstorm Event - 8) |||||||

FIG. 4E

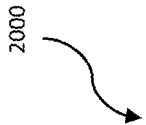

ASOS Information - NWS Certified Data Only (Measured Events)  Minimum Wind Speed: 50 mph

KSFB  Name: ORLANDO SANFORD AIRPORT  Distance: 8.33 mi. Lat, Long: 28.78°, -81.24° Bearing: 359°

| Time | Wind Direction | Wind Speed (2-Minute) | Wind Gusts (5-Sec) |
|---|---|---|---|
| 9/10/2017 (Wind Event - 1) | | | |
| 18:45 EDT | 80° | 37 mph | 51 mph |
| 19:06 EDT | 70° | 48 mph | 83 mph |
| 19:15 EDT | 70° | 33 mph | 83 mph |
| 19:48 EDT | 70° | 34 mph | 58 mph |
| 19:53 EDT | 80° | 31 mph | 51 mph |
| 20:01 EDT | 80° | 38 mph | 52 mph |
| 20:38 EDT | 80° | 46 mph | 63 mph |
| 20:53 EDT | 70° | 47 mph | 69 mph |
| 21:13 EDT | 70° | 39 mph | 59 mph |
| 21:22 EDT | 70° | 44 mph | 64 mph |
| 21:45 EDT | 100° | 34 mph | 66 mph |
| 21:51 EDT | 80° | 40 mph | 57 mph |
| 21:53 EDT | 90° | 40 mph | 57 mph |
| 22:00 EDT | 100° | 38 mph | 57 mph |
| 22:20 EDT | 70° | 47 mph | 62 mph |
| 22:29 EDT | 70° | 34 mph | 57 mph |
| 22:53 EDT | 110° | 41 mph | 69 mph |
| 23:02 EDT | 100° | 38 mph | 57 mph |
| 23:05 EDT | 100° | 40 mph | 57 mph |
| 23:20 EDT | 100° | 43 mph | 69 mph |
| 23:27 EDT | 100° | 40 mph | 67 mph |
| 23:29 EDT | 110° | 41 mph | 67 mph |
| 23:51 EDT | 100° | 40 mph | 66 mph |
| 23:53 EDT | 100° | 45 mph | 66 mph |
| 9/11/2017 (Wind Event - 2) | | | |
| 00:30 EDT | 110° | 44 mph | 62 mph |

*FIG. 4G*

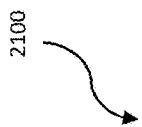

SWDI Information (Remote Sensing Events)

Minimum Size: 1.5" : Maximum Distance: 6 mi

| Item # | Site | Time | Range | Azimuth (Site to Event) | Severe Probability* | Max. Size | Distance |
|---|---|---|---|---|---|---|---|
| | | | | 7/2/2017 (Hail Event - 1) | | | |
| #1 | KMCO | 20:03 EDT | 25 nm | 342° | 80% | 1.5" | 5.08 mi. |
| | | | | 3/20/2018 (Hail Event - 2) | | | |
| #1 | KMCO | 14:43 EDT | 19 nm | 197° | 80% | 1.5" | 5.90 mi. |
| #2 | KMLB | 14:46 EDT | 44 nm | 193° | 70% | 2" | 5.58 mi. |
| #3 | KMCO | 14:46 EDT | 17 nm | 183° | 70% | 1.5" | 4.77 mi. |
| #4 | KTBW | 14:47 EDT | 82 nm | 183° | 90% | 2" | 4.95 mi. |
| #5 | KMCO | 14:49 EDT | 17 nm | 168° | 80% | 1.5" | 5.25 mi. |
| #6 | KJAX | 14:51 EDT | 115 nm | 160° | 90% | 1.75" | 5.03 mi. |
| #7 | KMCO | 14:52 EDT | 18 nm | 146° | 70% | 1.5" | 5.60 mi. |
| | | | | 5/15/2018 (Hail Event - 3) | | | |
| #1 | KTBW | 18:25 EDT | 85 nm | 314° | 70% | 1.75" | 3.53 mi. |
| | | | | 8/18/2018 (Hail Event - 4) | | | |
| #1 | KMCO | 18:30 EDT | 23 nm | 85° | 80% | 1.75" | 5.77 mi. |
| | | | | 7/6/2018 (Hail Event - 5) | | | |
| #1 | KMLB | 14:50 EDT | 47 nm | 36° | 40% | 1.5" | 2.91 mi. |
| #2 | KMCO | 14:56 EDT | 23 nm | 35° | 80% | 1.5" | 2.41 mi. |
| #3 | KMCO | 14:56 EDT | 23 nm | 35° | 80% | 1.5" | 2.41 mi. |
| | | | | 8/19/2018 (Hail Event - 6) | | | |
| #1 | KMLB | 18:12 EDT | 49 nm | 336° | 40% | 1.5" | 3.09 mi. |
| | | | | 4/6/2019 (Hail Event - 7) | | | |
| #1 | KMLB | 20:41 EDT | 50 nm | 304° | 80% | 1.5" | 4.18 mi. |
| #2 | KMCO | 20:41 EDT | 22 nm | 295° | 70% | 1.5" | 3.59 mi. |
| #3 | KMCO | 20:41 EDT | 22 nm | 295° | 70% | 1.5" | 3.59 mi. |
| #4 | KTBW | 20:42 EDT | 84 nm | 295° | 90% | 2" | 3.53 mi. |
| #5 | KMCO | 20:44 EDT | 21 nm | 276° | 70% | 1.75" | 3.34 mi. |
| #6 | KMCO | 20:44 EDT | 21 nm | 276° | 70% | 1.75" | 3.34 mi. |
| #7 | KJAX | 20:45 EDT | 110 nm | 281° | 80% | 1.75" | 3.74 mi. |
| #8 | KMCO | 20:47 EDT | 21 nm | 276° | 80% | 2" | 2.92 mi. |

*FIG. 4H*

DATA PROCESSING SYSTEM FOR GENERATING WEATHER REPORTS AND RELATED METHODS

RELATED APPLICATION

This application is continuation of prior filed application Ser. No. 17/550,342 filed Dec. 14, 2021, which is a continuation-in-part of prior filed application Ser. No. 16/952,200 filed Nov. 19, 2020, which is based upon prior filed Application No. 62/937,404 filed Nov. 19, 2019, the entire subject matter of which is incorporated herein by reference in its entirety.

TECHNICAL FIELD

The present disclosure relates to the field of data processing, and, more particularly, to a system for processing weather data and related methods.

BACKGROUND

Weather tracking and forecasting is important for protecting life and property from severe weather systems. One important component in weather tracking and forecasting is weather radar. In the United States, the National Weather Services (NWS), Federal Aviation Administration (FAA), and the U.S. Air Force operate a network of ground-based Doppler weather radars called Next-Generation Radar (NEXRAD). The NEXRAD system utilizes radar scan data to detect precipitation in the atmosphere as well as its movement. Data from the various NEXRAD stations may be combined to display regions of precipitation moving across a map.

With the information provided by radar or other weather imaging tools, forecasters attempt to predict when and where sever weather will occur. Numerical weather prediction (NWP) uses mathematical models of the atmosphere and oceans to predict the weather based on the measured weather conditions. While NWP modeling can be helpful, such modeling generally requires a large amount of computing power to process the voluminous data sets and complex equations required for such modeling. Moreover, NWP modeling may not provide the accuracy or granularity required for certain applications.

For example, in the insurance industry application, there is a need to determine weather events at a single residential or commercial address. This type of granularity may make this determination difficult. Indeed, in most cases, the answer for whether a specific weather event (e.g. a hail event) occurred at the address is merely a probability rather than an answer.

SUMMARY

Generally, a server is for producing a weather report for a physical street address of a user using a plurality of external weather event databases, each external weather event database comprising a different weather event data set. The server comprises a processor and memory configured to import the different weather event data sets from the plurality of external weather event databases, and perform a filtering process on the different weather event data sets from the plurality of external weather event databases. The filtering process comprises removing a given different weather event data set based upon an exposure category of geolocation data associated with the given different weather event data set, and determining matching events and updating associated geolocation values using geolocation data from a matching different weather event data set from a ground based source. The processor is configured generate the weather report based upon the filtered different weather event data sets from the plurality of external weather event databases and the physical street address of the user.

In some embodiments, the processor may be configured to retrieve tornado data from the plurality of external weather event databases. The filtering process may include determining a path of travel for the tornado data, and thresholding the tornado data based upon a distance from the physical street address of the user to the path of travel. The plurality of external weather event databases may comprise a Storm Events Database (SED), a Severe Weather Data Inventory (SWDI) database, and an Automated Surface Observing System (ASOS) database, for example.

Also, the processor may be configured to retrieve wind data from the SED and the ASOS database. The filtering process may comprise filtering the wind data based upon the exposure category of geolocation data associated with the wind data. The processor may be configured to filter the wind data over a time period. The processor may be configured to match events in the wind data from the SED with events in the ASOS database based upon date. The processor may be configured to update the associated geolocation values for matching events based upon geolocation data in the ASOS database. The filtering process may comprise filtering the different weather event data sets from the plurality of external weather event databases based upon a data quality metric.

Another aspect is directed to a method of operating a server for producing a weather report for a physical street address of a user using a plurality of external weather event databases, each external weather event database comprising a different weather event data set. The method comprises operating a processor in the server to import the different weather event data sets from the plurality of external weather event databases, and operating the processor to perform a filtering process on the different weather event data sets from the plurality of external weather event databases. The filtering process comprises removing a given different weather event data set based upon an exposure category of geolocation data associated with the given different weather event data set, and determining matching events and updating associated geolocation values using geolocation data from a matching different weather event data set from a ground based source. The method also includes operating the processor to generate the weather report based upon the filtered different weather event data sets from the plurality of external weather event databases and the physical street address of the user.

BRIEF DESCRIPTION OF THE DRAWINGS

Figure 3B:
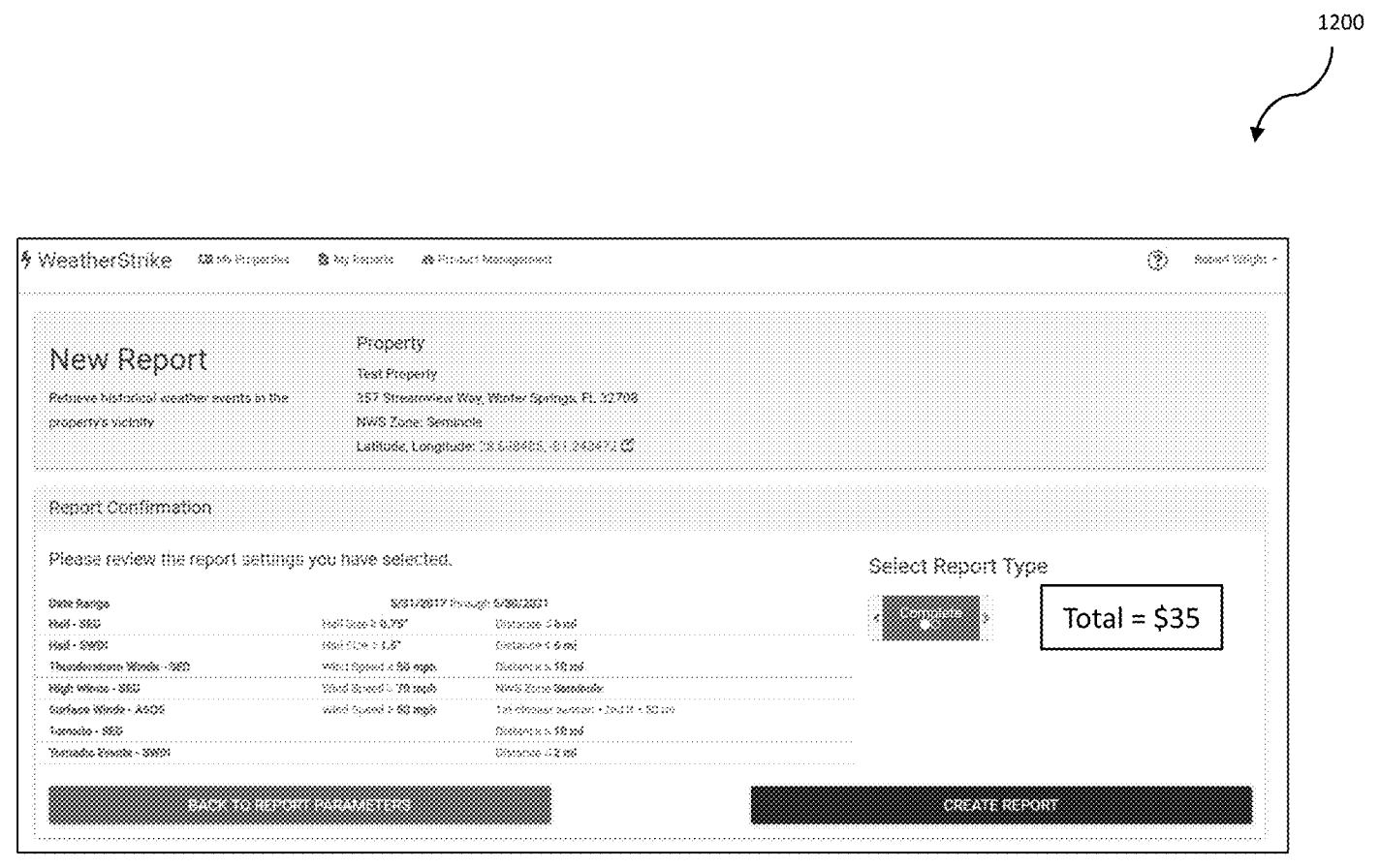

FIGS. 3A-3C are screenshots from an example embodiment of a user interface rendered by the server in the data processing system of FIG. 1.

FIGS. 4A-4I depict an example embodiment of a weather report from the data processing system of FIG. 1.

DETAILED DESCRIPTION

Figure 1:
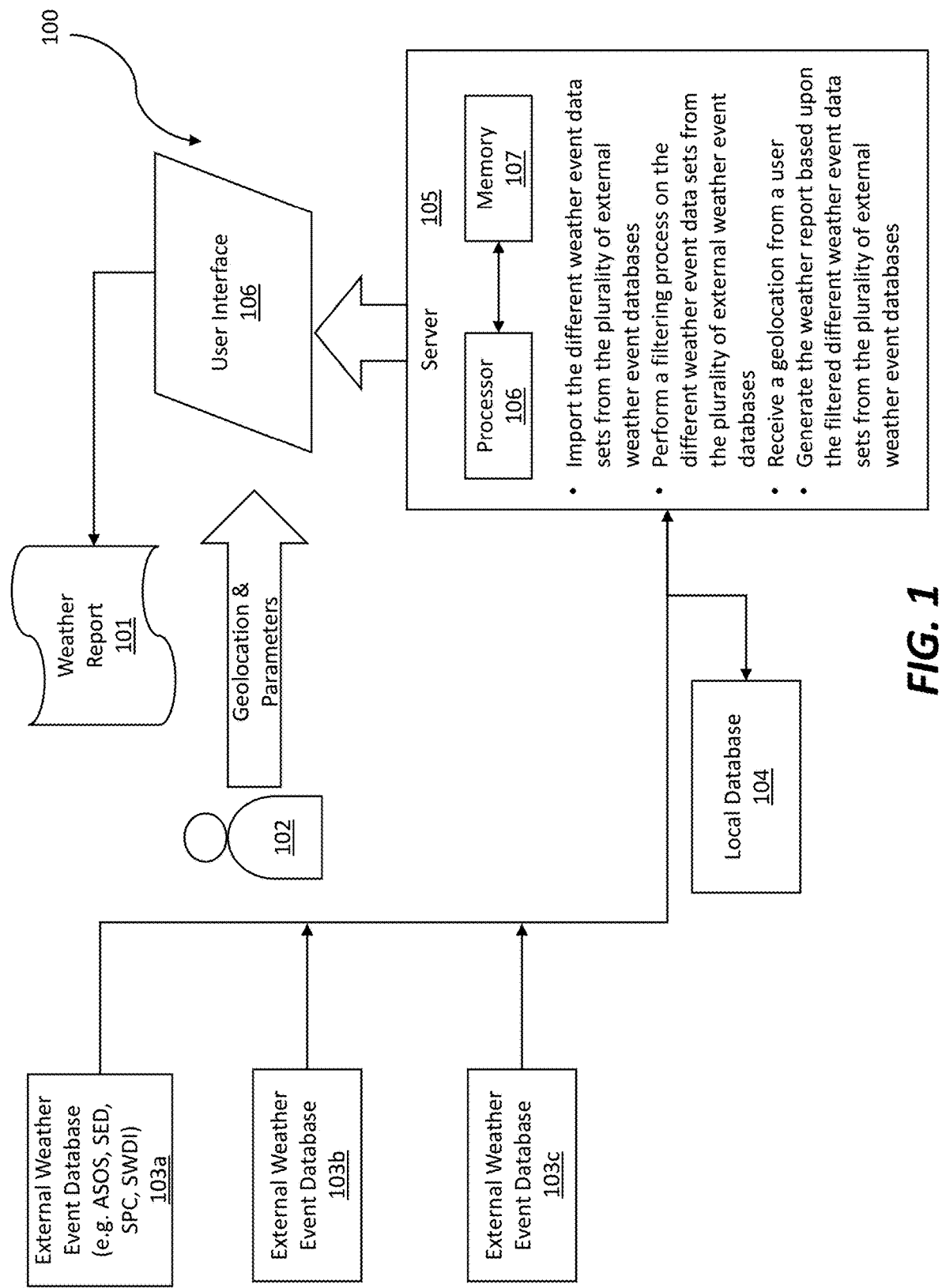
FIG. 1 is a schematic diagram of an example embodiment of a data processing system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a data processing system 100 according to the present disclosure is now described. The data processing system 100 is for producing a weather report 101 (See, e.g., FIGS. 4A-4I) for a user 102.

The data processing system 100 illustratively includes a plurality of external weather event databases 103a-103c. Each external weather event database 103a-103c comprises a different weather event data set (e.g. varying ground sources, methodology types). For example, the plurality of external weather event databases 103a-103c may comprise one or more of a NWS database, a Storm Prediction Center (SPC) database, a Storm Events Database (SED), a National Climatic Data Center (NCDC) database, a National Oceanic and Atmospheric Administration (NOAA) database, a Severe Weather Data Inventory (SWDI) database, an Automated Surface Observing System (ASOS) database, and a Next Generation Weather Radar (NEXRAD) database. This listing is not exclusive, and other databases may be additionally or alternatively included.

As will be appreciated, each of the plurality of external weather event databases 103a-103c may comprise a different source for the data. Some sources are considered more reliable than others, and may comprise ground truth data (i.e. having a high confidence value or a high quality metric value). For example, the ASOS database is generated via a network of ground based sensors, and is considered reliable ground truth data.

The data processing system 100 illustratively includes a local database 104, and a server 105 in communication with the local database and the plurality of external weather event databases 103a-103c. The server 105 illustratively includes a processor 106 and memory 107 cooperating therewith. In some embodiments, the local database 104 and the server 105 may be integrated. In some embodiments, the local database 104 may be omitted. For example, the local database 104 and the server 105 may be provided via a cloud computing service, such as the Google Cloud Platform or Amazon Web Services, or by a single or set of standalone computing devices.

The server 105 is configured to import the different weather event data sets from the plurality of external weather event databases 103a-103c. The server 105 is configured to retrieve tornado data, hail data, and wind data (i.e. high wind data, surface wind data, and thunderstorm wind data) from the plurality of external weather event databases 103a-103c. Since the plurality of external weather event databases 103a-103c may be updated with newly collected data, the server 105 is configured to periodically (e.g. daily or weekly) update the imported data stored in the local database 104.

More specifically, the tornado data is related to a tornado event, and may include a time of the tornado event, a tornado strength, a tornado start geolocation, and a tornado end geolocation. The hail data relates to a hail event and may comprise a time of the hail event, a hail event geolocation, a hail event duration, and a hail size. The server may be configured to retrieve wind data from the SED and the ASOS database. The wind data may comprise a wind speed, a wind measuring device location, and a wind speed report time.

The server 105 is configured to receive a set geolocation and a set date value from the user 102 via a user interface 110 and for the weather report 101. For example, the set geolocation may comprise a physical street address, a latitude and longitude set of coordinates, or a geographic area, such a county or a municipality. The set date value may comprise a time period range (e.g. a day, several weeks, months, years). The server 105 is also configured to receive a plurality of parameters from the user 102 for the weather report 101. The plurality of parameters sets the boundaries for data used for the weather report 101.

The server 105 is configured to perform a filtering process on the different weather event data sets from the plurality of external weather event databases 103a-103c. The filtering process first removes data based upon the plurality of parameters, the set geolocation, and the set date value. For example, the parameters may comprise a maximum distance value from the set geolocation. The server 105 is configured to filter out or threshold the data based upon the maximum distance value. If the geolocation values for the data exceeds the maximum distance to the set geolocation, the server 105 is configured to filter out the data.

Also, the different weather event data sets may be filtered based upon a time range about the set date value. For example, only data from within a day to 4-year time range of the set date value may be retained. For example, the data may be filtered based upon value size, such as the wind speed minimum comprising 50 mph for retention, and the hail size minimum comprising 0.75-5.0 inches for retention, for example.

In some embodiments, for the tornado data, the server 105 is configured to generate a path of travel for a given tornado event. Here, the server 105 is configured to extrapolate a linear path of travel from the tornado start geolocation and the tornado end geolocation, and threshold the tornado data based upon a distance from the set geolocation to a closest point of the path of travel. In particular, the server 105 is configured to extrapolate the linear path of travel by drawing a line between the tornado start geolocation and the tornado end geolocation.

The filtering process may comprise filtering the wind data based upon an exposure category of geolocation data associated with the wind data. As will be appreciated, the exposure category comprises one of Surface Roughness B (Urban and suburban areas, wooded areas or other terrain with numerous closely spaced obstructions having the size of single-family dwellings or larger); Surface Roughness C (Open terrain with scattered obstructions having heights generally less than 30 feet. This category includes flat open country, and grasslands.); and Surface Roughness D (Flat, unobstructed areas and water surfaces. This category includes smooth mud flats, salt flats and unbroken ice.). In some embodiments, the filtering process keeps only wind data associated with Exposure C/D geolocations.

The server 105 is configured to filter the wind data over a time period, thereby removing spurious data. The filtering process may comprise filtering the different weather event data sets from the plurality of external weather event databases 103a-103c based upon a data quality metric or a confidence value. In particular, if the data is associated with a confidence value less than a threshold minimum, the data is filtered out. Here, the ground truth data sources are given higher priority in the generation of the weather report 101.

Also, for the wind data from the ASOS database, the server 105 is configured to place wind data into two different time frame formats: 1-minute and 5-minute time formats. In an advantageous embodiment, the 5-minute increment format is used, which provides more accurate wind measurements. For wind, the values recorded in the 5-minute data WIND files are the 2-minute winds at the 5 minute times, 5 minutes after the hour, 10 minutes after the hour, etc. As noted in Section 3 of the AERMINUTE User's Guide (Publication No. EPA-454/B-15-006 October, 2015), the contents of which are hereby incorporated by reference in their entirety, the 1-minute ASOS data files often records with "garbled data" that do not follow any clear format. The 5-minute data WIND files are more consistent in format than the 1-minute WIND files.

The server 105 is configured to extract 5-second winds over 50 mph with the corresponding 2-minute winds for the two closest airports with airport location, distance, bearing, time, date, time (LST conversion from UTC), storm ID all in chronological order. The ASOS database has over 900 station locations with many stations being very small. The server 105 is configured to exclude these small stations, only including airport stations to provide a better quality of information (i.e. small stations have a lower confidence value).

In some embodiments, the different weather event data sets may be filtered based upon a type of associated weather event. For example, in the SED, the server 105 may retain only one or more of hail data, wind data, and tornado data. Also, these filtering criteria (parameters) can be customized for each of the plurality of external weather event databases 103a-103c to attenuate or amplify based upon trustworthiness of the external weather event database.

In some embodiments, the server 105 may retrieve overlapping tornado data, hail data, and wind data from one or more of the plurality of external weather event databases 103a-103c. In other words, for example, hail data for a given hail event may be documented in multiple databases. The server 105 is configured to match events (i.e. overlapping data) in the plurality of external weather event databases 103a-103c. The server 105 is configured to aggregate the data from multiple sources, determine confidence values for each source of the same data, and update the aggregate data by selecting the data from the source with the greater confidence value.

For example, the server 105 may be configured to match wind data from the SED with events in the ASOS database based upon date, and update the geolocation data for matching events based upon geolocation data in the ASOS database. The skilled person would appreciate that the ASOS database is generated via ground based sensors, and has more reliable geolocation data while the SED is generated via less reliable eyewitness reports from a multitude of sources.

Also, the data from the SWDI database for hail is remotely measured by the NEXRAD radar systems. The SWDI database includes a method for locating hail near a specific site location. The problem with this method is that the box around the specific site is not centered and is a rectangular box. It may not be possible to accurately determine NEXRAD radar hail around a specific site. Helpfully, the server 105 is configured to use the NOAA/NWS primary database to accurately locate all hail within a circle of 5 or 6 miles radius around a specific site.

In some embodiments, the server 105 is configured to process the different weather event data sets from the plurality of external weather event databases 103a-103c, and determine that no weather data is shown for a date and geolocation range. For example, if area within a 5 mile radius of the set geolocation is has no wind data for a subset time period within the set date value, the server 105 is configured to generate a message that no wind data exists for that date and geolocation range.

The server 105 is configured to generate the weather report 101 based upon the filtered different weather event data sets from the plurality of external weather event databases 103a-103c and the set geolocation. The weather report 101 may be rendered within the user interface 110 or within a downloadable file, such as portable document format (PDF) file.

To reduce bandwidth issues, in some embodiments, the server 105 is configured to limit the data retrieval to only the filtered different weather event data sets. In other embodiments, where low latency is desired, the server 105 is configured to batch download large portions or the entirety of the plurality of external weather event databases 103a-103c before generating the weather report 101.

In the illustrated embodiment, the server 105 is configured to generate a user interface 110 for input/output with the user 102. For example, the user interface 110 may comprise a web interface rendered within a web browser application (mobile or desktop). The user interface 110 may also comprise an application programming interface for permitting native operating system applications to interact with the server 105.

Figure 2A:
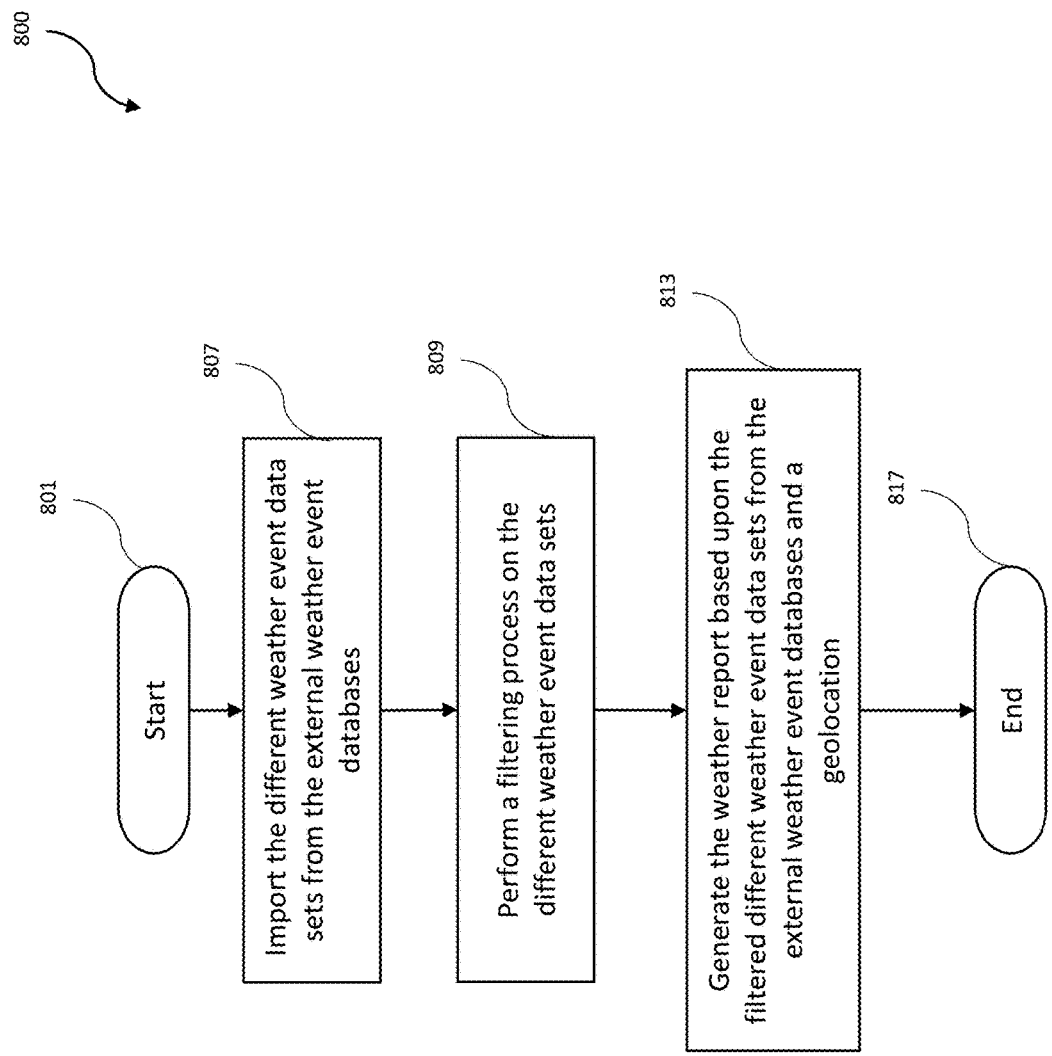
FIG. 2A is a flowchart illustrating operation of a server in the data processing system of FIG. 1.
Figure 2B:
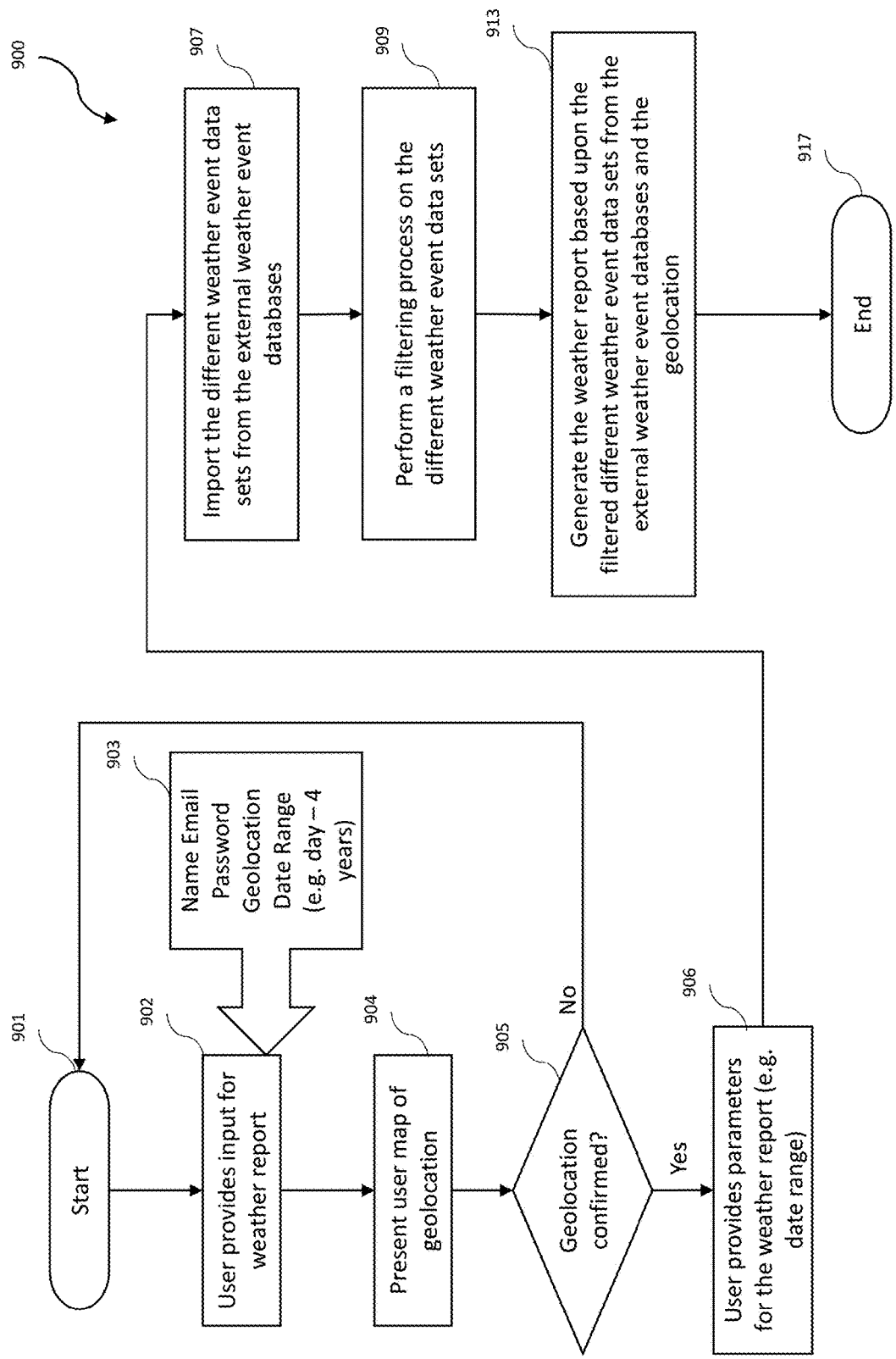
FIG. 2B is a more detailed flowchart illustrating operation of the server in the data processing system of FIG. 1.
Figure 3A:
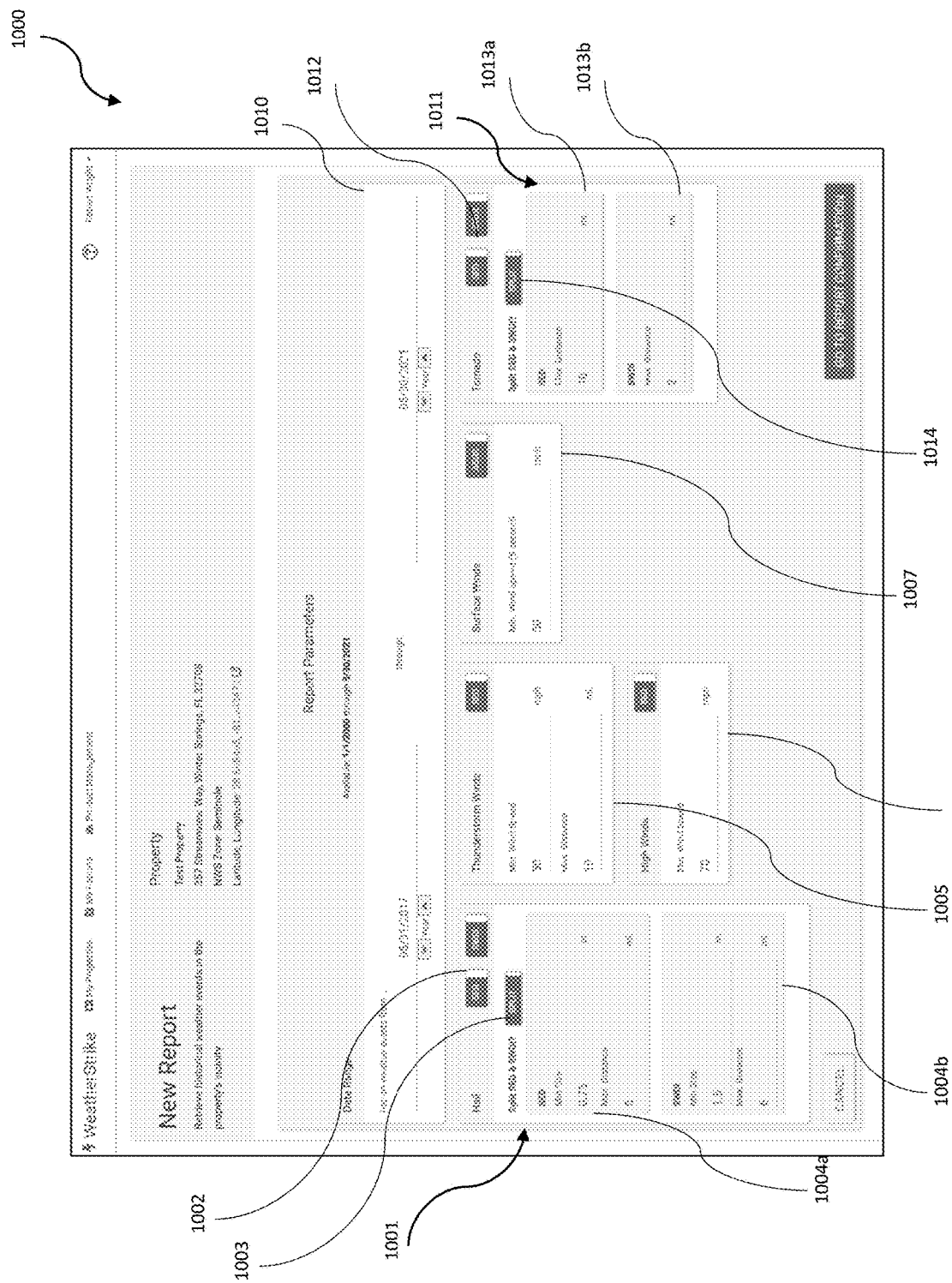
Figure 3C:

Referring now additionally to FIG. 2A, a flowchart 800 for operation of the exemplary embodiment of the server 105 in the data processing system 100 is shown, which begins at Block 801. The method of operating the server 105 is for producing a weather report 101 using a plurality of external weather event databases 103a-103c, each external weather event database comprising a different weather event data set. The method comprises operating a processor 106 in the server 105 to import the different weather event data sets from the plurality of external weather event databases 103a-103c (Block 807), and operating the processor to perform a filtering process on the different weather event data sets from the plurality of external weather event databases (Block 809). The method comprises operating the processor 106 to generate the weather report 101 based upon the filtered different weather event data sets from the plurality of external weather event databases 103a-103c and a geolocation (Block 813). The method ends at Block 817.

Referring now additionally to FIGS. 2B and 3A-3C, a flowchart 900 for operation of the exemplary embodiment of the server 105 in the data processing system 100 and an exemplary embodiment of the user interface 110 are shown. The method begins at Block 901. At Blocks 902-903, the method includes the preliminary interactions with the user 102 via the user interface 110. In particular, the set geolocation, the set date value, user name, and user email are received from the user 102. The user interface 110 is configured to render a map view of the geolocation for the user 102 at Block 904. Additionally, the user interface 110 also receives payment information from the user 102. At Block 905, the geolocation is confirmed, and at Block 906, the user provides the parameter values for the weather report 101.

The server 105 is configured to render a parameter interface 1000 for the user 102. As illustrated, the parameter interface 1000 illustratively includes a hail interface 1001 having an slider buttons 1002 for enabling use of data from the external weather event databases 103a-103c (e.g. the illustrated SED and SWDI database) for the weather report 101, a slider button 1003 for enabling splitting of the data within the for the weather report 101, and respective interfaces 1004a-1004b for setting minimum size of hail and maximum distance from the set geolocation for each database used. As shown, these parameters can be customized for each external weather event database 103a-103c (e.g. the illustrated SED and SWDI database). The parameter interface 1000 includes a thunderstorms winds interface 1005 for setting minimum size of hail, and maximum distance from the set geolocation, a high winds interface 1006 for setting a minimum speed for wind, and a surface winds interface 1007 for setting a minimum speed for wind. The parameter interface 1000 illustratively includes a date interface 1010 for providing the set date value for the weather report 101, and a tornado interface 1011 having an slider buttons 1012 for enabling use of data from the external weather event databases 103a-103c (e.g. the illustrated SED and SWDI database) for the weather report 101, a slider button 1014 for enabling splitting of the data within the for the weather report 101, and respective interfaces 1013a-1013b for setting a maximum distance from the set geolocation for each database used.

Once the parameters for the weather report 101 have been entered, the user interface 110 illustratively comprises a confirmation interface 1200 providing the user 102 an opportunity to confirm the parameters and the proposed cost for the weather report 101. Once the user 102 confirms the parameters of the weather report 101, the user interface 110 transitions to a status update interface 1300.

At Block 907, the server 105 is configured to import the different weather event data sets from the plurality of external weather event databases 103a-103c. In the illustrated embodiment, the server 105 is configured to download the data from the NWS and SED databases, and from the ASOS, NOAA, NEXRAD, and SWDI databases.

At Block 909, the method includes a filtering process on the different weather event data sets from the plurality of external weather event databases 103a-103c. At Block 913, the method comprises operating the processor 106 to generate the weather report 101 based upon the filtered different weather event data sets from the plurality of external weather event databases 103a-103c and the set geolocation. The method ends at Block 917.

Referring now additionally to FIGS. 4A-4I, an exemplary embodiment of the weather report 101 is shown. The weather report 101 includes a separate report for each type of NOAA/NWS product. The detailed report for each report section provides information about the weather events in chronological sequence from the oldest to newest event with storm ID, date, time, source information, distance, bearing of site to event, and latitude/longitude of event location.

Figure 4A:
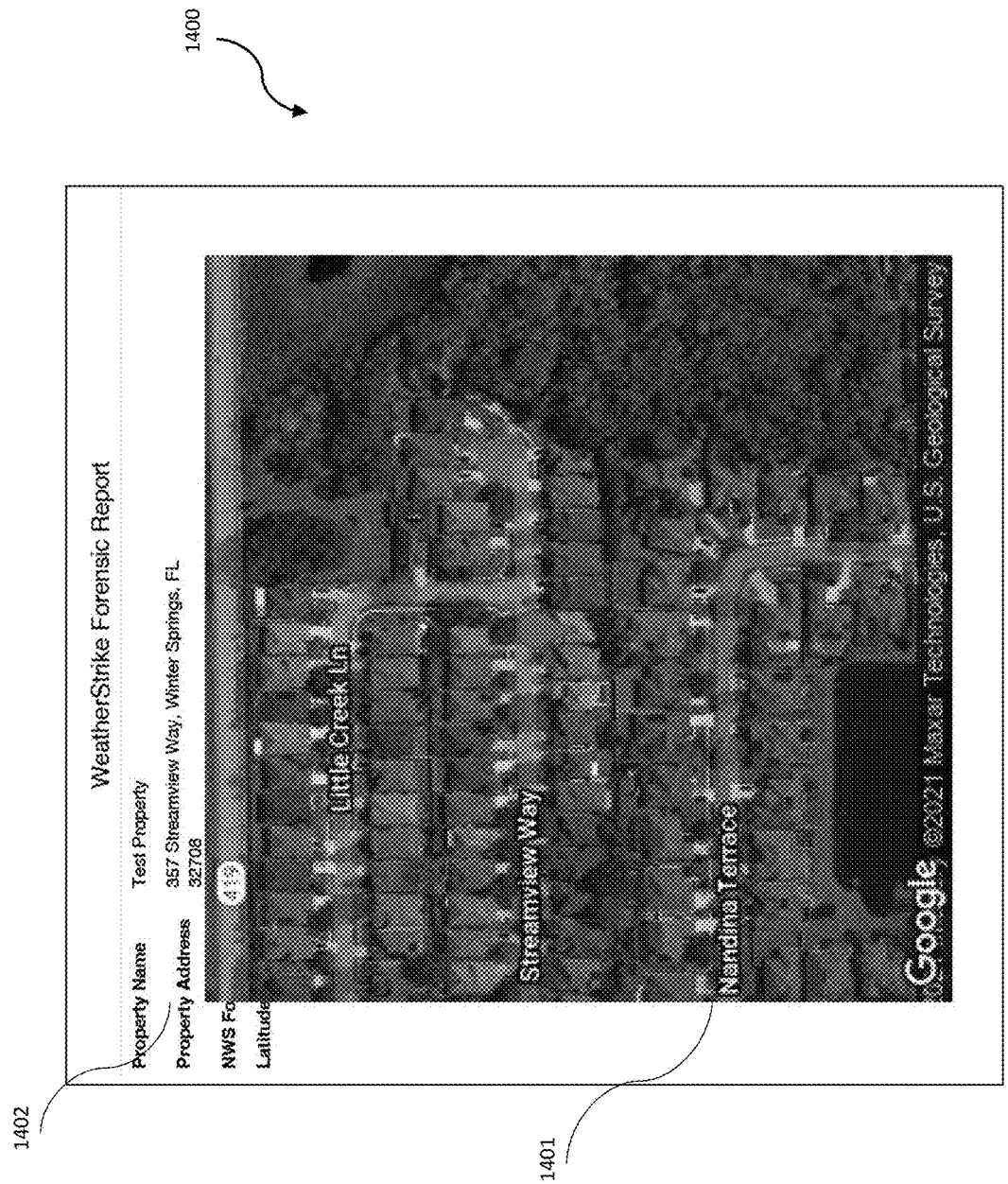

As shown in FIG. 4A, the map preview 1400 of the geolocation data is provided within the weather report 101, which includes a map preview 1401, and an associated address field 1402. In FIG. 4B, the filtering parameters are provided in a report parameters section 1500.

Figure 4C:
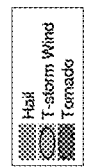

In FIG. 4C, the weather report 101 includes a hail and wind report summary section 1600. The hail and wind report summary section 1600 illustratively includes a chart with multiple columns. From left to right, the columns include the storm event dates, the source of the event data, and several columns of increasing distance from the set geolocation to the storm event. The chart includes color codes each cell for being either related to a hail event, a thunderstorm event, or a tornado event.

In FIG. 4D, the weather report 101 includes a SED hail information section 1700. The SED hail information section 1700 illustratively includes a chart with multiple columns. From left to right, the columns include the location of the event, the time of the event, the source of the event, the reported hail size, the azimuth from the geolocation to the event, and the range from the geolocation to the geolocation associated with the event.

In FIG. 4E, the weather report 101 includes a SED thunderstorm wind report summary section 1800. The SED thunderstorm wind report summary section 1800 illustratively includes a chart with multiple columns. From left to right, the columns include the location of the event, the time of the event, the source of the event, the reported wind speed and wind type, the azimuth from the geolocation to the event, and the range from the geolocation to the geolocation associated with the event.

Figure 4F:

In FIG. 4F, the weather report 101 includes a SED tornado report summary section 1900. The SED tornado report summary section 1900 illustratively includes a chart with multiple columns. From left to right, the columns include the location of the event, the time of the event, the source of the event, the reported length and width and azimuth, the reported strength, and the distance traveled along with start and end values.

In FIG. 4G, the weather report 101 includes an ASOS surface wind report summary section 2000. The ASOS surface wind report summary section 2000 illustratively includes a chart with multiple columns. From left to right, the columns include the time of the vent, the wind direction, the wind speed, and the wind gust speed.

In FIG. 4H, the weather report 101 includes a SWDI hail information section 2100. The SWDI hail information section 2100 illustratively includes a chart with multiple columns. From left to right, the columns include the location of the event, the time of the event, the radar range, the azimuth of the event, the probability of severity, the reported hail size, and the distance from the event to the set geolocation.

Figure 4I:

In FIG. 4I, the weather report 101 includes a SWDI tornado information section 2200. The SWDI tornado information section 2200 illustratively includes a chart with multiple columns. From left to right, the columns includes the site identifier, the time of the vent, the radar range, the azimuth of the event, the maximum shear value of the event, the maximum delta velocity, and the distance from the geolocation to the event.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A server for producing a weather report for a physical street address of a user using a plurality of external weather event databases, each external weather event database comprising a different weather event data set, the server comprising:

a processor and memory configured to import the different weather event data sets from the plurality of external weather event databases, the different weather event data sets comprising tornado data, perform a filtering process on the different weather event data sets from the plurality of external weather event databases, the filtering process comprising removing a given different weather event data set based upon an exposure category of geolocation data associated with the given different weather event data set, determining matching events and updating associated geolocation values using geolocation data from a matching different weather event data set from a ground based source, generating a linear path of travel for a tornado event in the tornado data based upon a tornado start geolocation value and a tornado end geolocation value, and thresholding the tornado data based upon a distance from the physical street address of the user to a closest point in the linear path of travel for the tornado event in the tornado data, and generate the weather report based upon the filtered different weather event data sets from the plurality of external weather event databases and the physical street address of the user.

2. The server of claim 1 wherein the plurality of external weather event databases comprises a Storm Events Database (SED), a Severe Weather Data Inventory (SWDI) database, and an Automated Surface Observing System (ASOS) database.

3. The server of claim 2 wherein the processor is configured to retrieve wind data from the SED and the ASOS database.

4. The server of claim 3 wherein the filtering process comprises filtering the wind data based upon the exposure category of geolocation data associated with the wind data.

5. The server of claim 3 wherein the processor is configured to filter the wind data over a time period.

6. The server of claim 3 wherein the processor is configured to match events in the wind data from the SED with events in the ASOS database based upon date.

7. The server of claim 6 wherein the processor is configured to update the associated geolocation values for matching events based upon geolocation data in the ASOS database.

8. The server of claim 1 wherein the filtering process comprises filtering the different weather event data sets from the plurality of external weather event databases based upon a data quality metric.

9. The server of claim 1 wherein the filtering process comprises removing data from the different weather event data sets with a geolocation exceeding a set distance from the physical street address.

10. A server for producing a weather report for a physical street address of a user using a plurality of external weather event databases, each external weather event database comprising a different weather event data set, the plurality of external weather event databases comprising a Storm Events Database (SED), a Severe Weather Data Inventory (SWDI) database, and an Automated Surface Observing System (ASOS) database, the server comprising:

a processor and memory configured to import the different weather event data sets from the plurality of external weather event databases, retrieve tornado data from the plurality of external weather event databases, perform a filtering process on the different weather event data sets from the plurality of external weather event databases, the filtering process comprising removing a given different weather event data set based upon an exposure category of geolocation data associated with the given different weather event data set, determining matching events and updating associated geolocation values using geolocation data from a matching different weather event data set from a ground based source, generating a linear path of travel for a tornado event in the tornado data based upon a tornado start geolocation value and a tornado end geolocation value, thresholding the tornado data based upon a distance from the physical street address of the user to a closest point in the linear path of travel for the tornado event in the tornado data, and removing data from the different weather event data sets with a geolocation exceeding a set distance from the physical street address, and generate the weather report based upon the filtered different weather event data sets from the plurality of external weather event databases and the physical street address of the user.

11. The server of claim 10 wherein the processor is configured to retrieve wind data from the SED and the ASOS database.

12. The server of claim 11 wherein the filtering process comprises filtering the wind data based upon the exposure category of geolocation data associated with the wind data.

13. The server of claim 11 wherein the processor is configured to filter the wind data over a time period.

14. The server of claim 11 wherein the processor is configured to match events in the wind data from the SED with events in the ASOS database based upon date.

15. The server of claim 14 wherein the processor is configured to update the associated geolocation values for matching events based upon geolocation data in the ASOS database.

16. The server of claim 10 wherein the filtering process comprises filtering the different weather event data sets from the plurality of external weather event databases based upon a data quality metric.

17. A method of operating a server for producing a weather report for a physical street address of a user using a plurality of external weather event databases, each external weather event database comprising a different weather event data set, the method comprising:

operating a processor in the server to import the different weather event data sets from the plurality of external weather event databases, the different weather event data sets comprising tornado data;

operating the processor to perform a filtering process on the different weather event data sets from the plurality of external weather event databases;

the filtering process comprising removing a given different weather event data set based upon an exposure category of geolocation data associated with the given different weather event data set, determining matching events and updating associated geolocation values using geolocation data from a matching different weather event data set from a ground based source, generating a linear path of travel for a tornado event in the tornado data based upon a tornado start geolocation value and a tornado end geolocation value, and thresholding the tornado data based upon a distance from the physical street address of the user to a closest point in the linear path of travel for the tornado event in the tornado data; and operating the processor to generate the weather report based upon the filtered different weather event data sets from the plurality of external weather event databases and the physical street address of the user.

18. The method of claim 17 wherein the plurality of external weather event databases comprises a Storm Events Database (SED), a Severe Weather Data Inventory (SWDI) database, and an Automated Surface Observing System (ASOS) database.

19. The method of claim 18 further comprising retrieving wind data from the SED and the ASOS database.

20. The method of claim 17 wherein the filtering process comprises removing data from the different weather event data sets with a geolocation exceeding a set distance from the physical street address.

* * * * *